United States Patent [19]
Culbreth et al.

[11] Patent Number: 5,953,393
[45] Date of Patent: *Sep. 14, 1999

[54] PERSONAL TELEPHONE AGENT

[75] Inventors: Pamela Jean Culbreth, Middletown, N.J.; Peter John Danielsen, Naperville, Ill.; Robert J. Hall, Berkeley Heights, N.J.; Elena Maria Papavero, Ocean, N.J.; Loren Gilbert Terveen, Basking Ridge, N.J.; Mark Logan Tuomenoksa, Shrewsbury, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,766

[22] Filed: Jul. 15, 1996

[51] Int. Cl.⁶ ...................................................... H04M 1/64
[52] U.S. Cl. ...................................... 379/88.25; 379/92.03
[58] Field of Search ................................. 379/67, 88, 89, 379/88.25, 88.26, 92.01, 92.02, 92.03

[56] References Cited

U.S. PATENT DOCUMENTS

| | | | |
|---|---|---|---|
| 4,602,129 | 7/1986 | Matthews et al. | 379/89 |
| 4,975,841 | 12/1990 | Kehnemuyi et al. | 364/401 |
| 5,155,763 | 10/1992 | Bigus et al. | 379/113 |
| 5,164,983 | 11/1992 | Brown et al. | 379/265 |
| 5,199,062 | 3/1993 | Von Meister et al. | 379/205 |
| 5,297,195 | 3/1994 | Thorne et al. | 379/93 |
| 5,333,180 | 7/1994 | Brown et al. | 379/89 |
| 5,430,792 | 7/1995 | Jesurum et al. | 379/67 |
| 5,436,965 | 7/1995 | Grossman et al. | 379/266 |
| 5,509,055 | 4/1996 | Ehrlich et al. | 379/133 |
| 5,528,670 | 6/1996 | Elliot et al. | 379/88.25 |

OTHER PUBLICATIONS

Materials printed from Wildfire Communications, Inc. World Wide Web Site, Jun. 19, 1996.
Materials printed from virtuosity.com World Wide Web Site, Jun. 19, 1996.
Materials printed from Buideware Corp. World Wide Web Site, Oct. 3, 1996.
Materials printed from pls.com World Wide Web Site.
Page printed from zilker.net World Wide Web Site.
Page printed from informant.dartmouth.edu World Wide Web Site.

*Primary Examiner*—Fan S. Tsang

[57] ABSTRACT

A personal telephone messaging agent can automate routine scheduling, coordinating and information gathering tasks while maintaining the advantages inherent in the telephone system. A person specifies a message and, optionally, some specific questions, and a list of recipients to his or her personal messaging agent. The messaging agent delivers the message to and collects a response from each messaging recipient using the telephone system. When each intended recipient has been reached, the agent contacts the sender to report the results or, optionally, the agent could undertake routine tasks such as scheduling a meeting based upon the responses and assigning a conference room for the meeting.

An even more sophisticated personal telephone agent may be employed in the context of an information retrieval service. An IVR system has an interface designed for people to use. However, the databases of information that an IVR system draws upon could be accessed over the telephone network by an automated agent using an interface designed for agent access. In this way, a messaging agent can be used to retrieve the desired information and report back to the caller.

The personal telephone messaging system of the present invention can be applied to tasks such as scheduling a meeting, confirming a decision, determining the price of an item, and finding flight information.

42 Claims, 2 Drawing Sheets

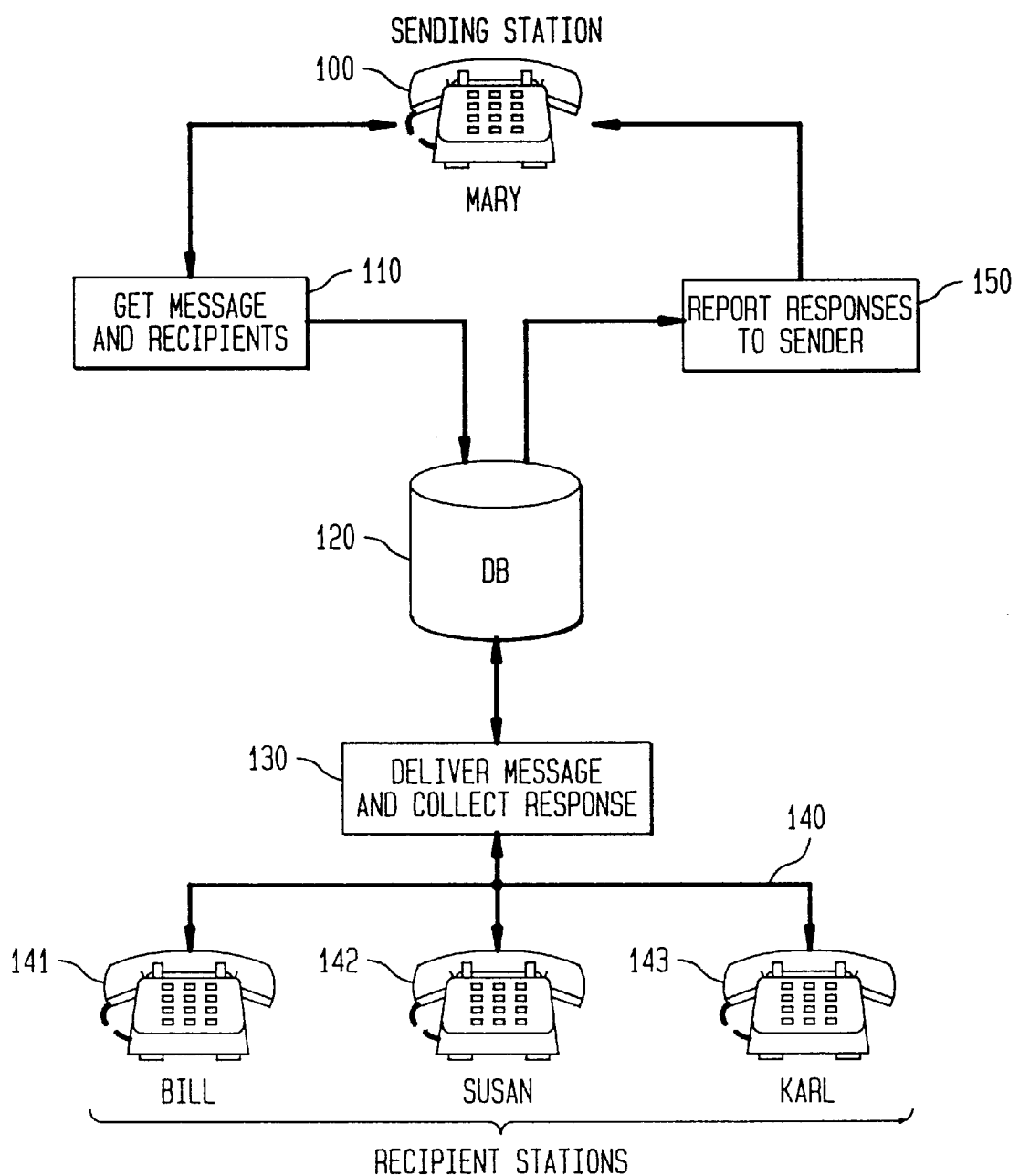

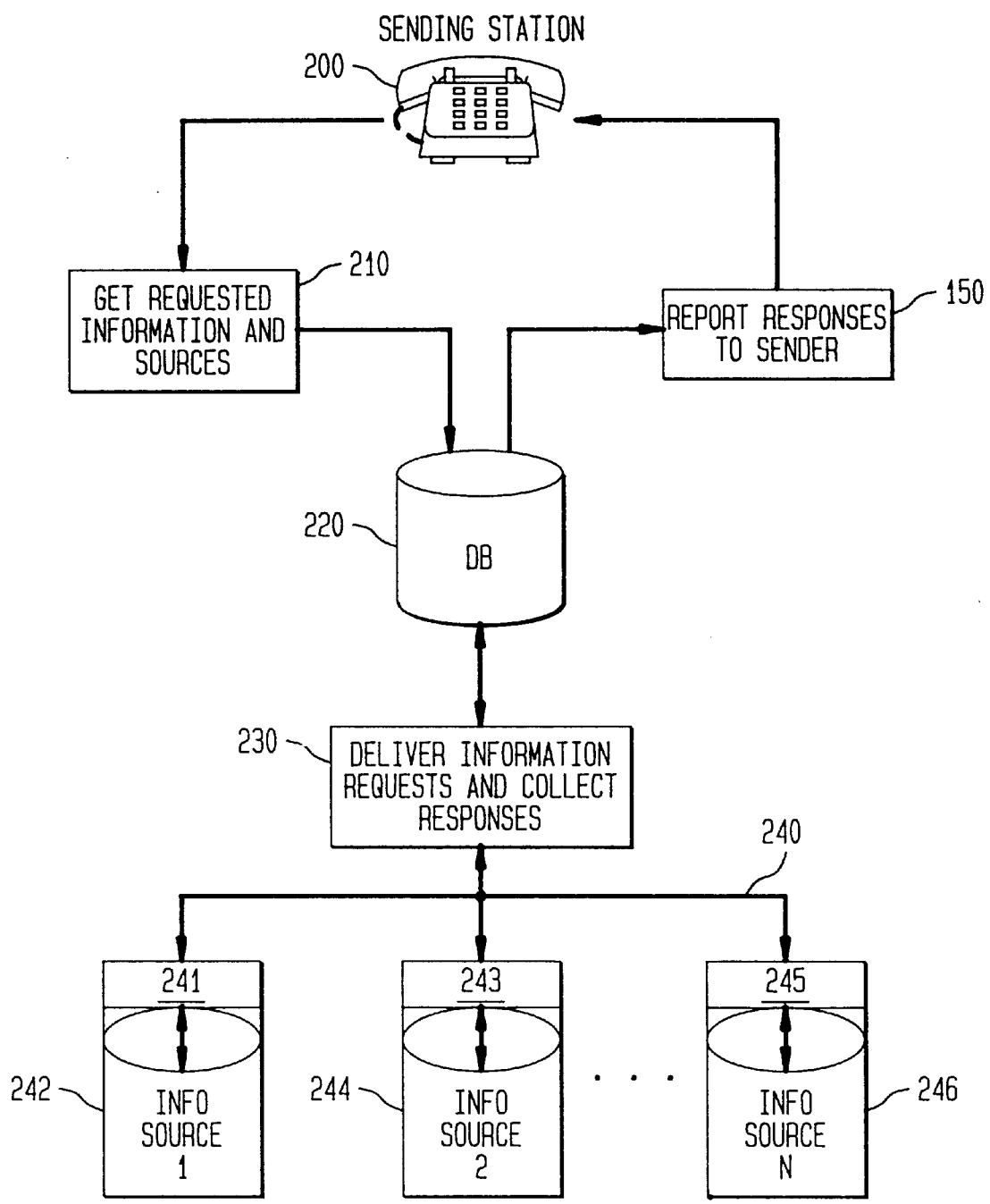

PERSONAL TELEPHONE AGENT

TECHNICAL FIELD

This invention relates to personal agents and, more particularly, provides a new method for automating routine telephone messaging and information gathering tasks by taking advantage of agent technology in combination with telephone system technology.

BACKGROUND OF THE INVENTION

Personal agents are computer programs that act on behalf of individuals, especially to perform routine, tedious, but not particularly difficult or novel tasks. The coordination, scheduling, and information gathering tasks of professional work generally require communication among individuals. These tasks are often carried out using the telephone and are prime candidates for the support of such a personal agent.

The telephone is a convenient tool for communication, not only because of its relative low cost but also because of the almost universal availability of telephone service. Telephone communication permits the natural conversational structure inherent in face-to-face communication to take place over long distances. However, even routine communications by telephone may suffer when a called party is unavailable. When that occurs, answering machines, voice messaging systems, and even a human operator provide a means for leaving a message; however, an oft-occurring problem is that of "telephone tag" where two parties keep trading messages to call the other. Another problem that often arises in attempting to reach a called party is the time spent while placed on hold or in navigating telephone menu systems.

Electronic mail, generally known as e-mail, provides an alternative way of communicating over long distances. E-mail does not suffer from the "tag" problem because that form of communication does not require the recipient to be in a position to observe the message at the time the e-mail message is transmitted; one may retrieve and read e-mail at any time after the message is sent, as long as the message remains electronically stored at the recipient's end. However, unlike the telephone system, e-mail is far from universally available, and use of e-mail typically requires access through a computer that is relatively expensive in comparison to a telephone; e-mail access in some environments may also require interconnection of computers through an expensive local area network. Further, e-mail does not generally maintain the conversational structure inherent in person-to-person communications; follow-up questioning may be cumbersome and generally requires additional exchange of e-mail messages. While there is e-mail technology that permits auto responses, the technology appears to be limited to capabilities such as return receipt, automatic transmission of canned messages, and automatic subscribing activities over the Internet in response to a formatted request. There is little, if any, analysis and reporting based upon messaging content.

Similarly, the telemarketing field makes little attempt to analyze the content of responses received but rather is geared toward analysis of call response patterns for the purposes of determining the allocation of resources to maximize success in making outgoing calls or in handling incoming calls. Once a call is connected it is then turned over to a live operator or, perhaps, to an interactive voice response system.

Related communication delay problems arise even with relatively simple information retrieval requests. The following example of a typical information seeking dialogue is illustrative.

Suppose it is desired to find out the price of a certain portable CD player at various stores. A person calling a store might be answered by a clerk who asks what is wanted. After the caller responds that she seeks the price of the CD player, she will likely be asked to hold while the clerk locates another employee with more information—information likely to be available on a database. Eventually, someone in the proper department will pick up the phone and ask again what is wanted. The caller will repeat the request and, perhaps after more waiting, may get an answer.

Another store may place the caller in what is known as an interactive voice response (IVR) system—typically a menu-driven system in which a caller sequentially selects various options by pressing a button on the telephone keypad in response to a set of choices. Eventually, after pressing a series of buttons, the caller may be placed on hold waiting for the next available representative according to the menu selections. Once reached, the representative might consult a database to provide the requested information. Similarly, in using an IVR system to get information about an item, the user constructs the item's description incrementally by responding to a series of menus and prompts. For example, a store having an IVR system for delivering information about items that it carries may have a main menu that tells a caller "For VCR players, press 1. For TVs, press 2. For audio components, press 3 . . . ". In response to a selection, e.g., "3" for audio components, another menu might give options like "For integrated systems, press 1. For receivers, press 2. For CD players, press 3 . . . ". Traversing a sequence of menus eventually leads callers to the items they are interested in.

The conceptual simplicity of a caller's task—"I just want to find out the price of the Brand X Model A portable CD player"—and the routine and tedious nature of the interaction suggest it a good candidate for automation by a personal agent. However, the details of the interaction are unpredictable. An agent must determine whether it is engaging a person or an IVR system, when a question is asked, when it is put on hold or transferred, etc.

Furthermore, engaging in this type of interaction using an automated process appears to require the capability of speech recognition and language understanding in an unconstrained environment; that is, the speech from the information source would not necessarily be limited to a set of responses from an expected recognition grammar, such as "yes" or "no", or the days of the week, or the time of day. It is known to successfully employ prompt-constrained speech recognition processes where the expected speech is limited to words uttered in response to a message, e.g., recognition of "Monday" or "Tuesday" spoken in response to a prompt asking for a day of the week. However, to enable an automated response to speech that is not constrained by an expected recognition grammar such as listed above would require speech recognition capabilities that are beyond the current state of the art.

There appears to be some Internet-based personal agent technology having rudimentary capabilities. For example, there is a reference to "Clearlake Personal Agents" at World Wide Web site http://www.guideware.com which appears to be a design tool for designing a software agent to "perform, coordinate and track complex processes over time" over the Internet. Similarly, a reference to a software product called "PersonaL-Agent" is found at http://www.pls.com (under /products/agnt1.html) which appears to perform the task of periodically retrieving information from full-text databases such as news feeds or posted text. However, such agent technology is not audio-or voice-based, and not implemented in a telephone network environment. Internet-resident agents share the disadvantages of e-mail, such as requiring the use of a relatively expensive personal computer to establish an electronic connection to a less than universally-accessible network—in this case, to the Internet, which has lesser accessibility than e-mail.

One telephone-related system called Wildfire appears to handle some rudimentary telephone chores, such as call screening, routing and announcement, voice dialing, call scheduling and reminding, voice mail integration, paging and call conferencing. While the Wildfire system appears to have the advantage of allowing its functionality to be accessible from any telephone or mobile phone, Wildfire does not offer automatic message building and delivery, it does not offer the capability of analyzing and reporting messaging results back to the sender, nor does it offer information retrieval capability.

What is desired is a way to utilize the advantages of the telephone system while providing a way to automate some of the routine communication tasks of scheduling, coordinating, gathering information and reporting so as to reduce the time engaged in "telephone tag" and other unproductive delays. Also desired is a way of engaging in automated information retrieval from sources reachable by telephone.

SUMMARY OF THE INVENTION

An object of the present invention is to provide a personal telephone messaging agent that can automate some routine scheduling, coordinating and information gathering tasks while maintaining the advantages inherent in the telephone system. The basic concept involves the marriage of active agent technology with the passive, ubiquitous telephone system technology. A person specifies a message and, optionally, some specific questions, and a list of recipients to his or her personal messaging agent. The messaging agent delivers the message to and collects a response from each messaging recipient using the telephone system. When each intended recipient has been reached, the agent contacts the sender to report the results. Optionally, the agent could undertake routine tasks such as scheduling a meeting based upon the responses and assigning a conference room for the meeting.

An even more sophisticated personal telephone agent may be employed in the context of an information retrieval service. An IVR system has an interface designed for people to use. However, the databases of information that an IVR system draws upon could be accessed over the telephone network by an automated agent using an interface designed for agent access. In this way, a messaging agent can be used to retrieve the desired information and report back to the caller. The information retrieval agent (IR agent) interface consists of an internal representation of items, attributes, and values suitable for transmission over telephone lines and textual descriptions of items, attributes, and values appropriate for communication with a person. The agent interface for a particular service could be made available to each user of the IR agent, thus adding potential new tasks that the agent can perform upon appropriate user requests.

A personal telephone messaging agent will enhance telephone communication. First, telephone tag will be reduced since the agent is responsible for delivering messages and reporting results. Second, a telephone messaging agent embodies and maintains the useful conversational structure that consists of a message and its responses, so the user does not have to manage the conversation. Finally, given the virtually universal availability of relatively inexpensive telephone service, both fixed and mobile, telephone messaging agents will have broad access to persons and markets that may have no access to e-mail and Internet connections.

The personal telephone messaging system of the present invention can be applied to tasks such as scheduling a meeting, confirming a decision, determining the price of an item, and finding flight information.

BRIEF DESCRIPTION OF THE DRAWINGS

FIG. 1 shows an illustrative automated personal telephone agent for messaging in accordance with the present invention.

FIG. 2 shows another illustrative automated personal telephone agent for information retrieval in accordance with the present invention.

DETAILED DESCRIPTION

According to the present invention, the telephone messaging agent can be applied to tasks such as scheduling a meeting, confirming a decision, determining the price of an item, and finding flight information. In an implementation of a telephone messaging agent, users call their agents, speak to them, and their commands are understood through automatic speech recognition technology. An agent delivers messages and reports results by placing telephone calls. Sender messages and recipient responses are recorded and played back as appropriate. An example illustrating the application of a telephone message agent for scheduling is now described with reference to FIG. 1. Suppose that Mary, an account manager, uses her personal telephone messaging agent to schedule a meeting with the members of her account team, Bill, Susan, and Karl. Mary accesses the agent through telephone station 100.

A first stage 110 of the agent is responsible for obtaining the message and the intended message recipients. Mary begins by specifying a message to stage 110 of the agent—"Hi everybody, I'd like to meet Wednesday at 9:00 in Room 3F-422 to update you on the Simpson account. Please let me know whether you can attend". Mary then instructs the agent to deliver the message to the Simpson account team, and requests the agent to collect RSVPs. Stage 110 formats the message if necessary and sends the message to database 120 along with the recipient identification—the Simpson account team. Stage 110 may also send to database 120 information about the identification of the sender—Mary—and the date and time of the message, and submit instructions for scheduling the delivery of the message. The message is stored in database 120, which also contains the identity of the individuals making up the Simpson account team—Bill, Susan and Karl—and their telephone numbers. In accordance with any scheduling instructions, a second stage 130 responsible for delivering the message and collecting responses obtains the message, along with the recipient identifications—Bill, Susan and Karl—and their telephone numbers from database 120.

Stage 130 then attempts to deliver the message to each member of the account team over network 140 by dialing each of the telephone numbers for telephone stations 141, 142 and 143 corresponding to Bill, Susan and Karl. When a recipient's telephone, e.g., Bill's telephone 141, is answered, stage 130 delivers the message by sending it to telephone 141 so that Bill hears the message left by Mary, "Hi everybody, I'd like to meet Wednesday at 9:00 in Room 3F-422 to update you on the Simpson account. Please let me know whether you can attend". Stage 130 then asks the recipient for a response.

If a recipient is not reached, stage 130 may retry delivery at predetermined intervals until the recipient is reached. After a certain amount of time and number of unsuccessful delivery attempts, the attempt to deliver the message to that recipient is considered to have failed.

To continue, suppose that Bill, Susan, and Karl all accepted the message and left a response. Bill responded by saying "Hi Mary. I got your message about the meeting Wednesday morning. I can make it, and I'll look forward to the update". Stage 130 stores the message, with any necessary reformatting, on database 120. Stage 130 may also send information identifying the original sender, Mary. Stage 130 also collects Susan's response—"Hi Mary. Sorry, but I can't make the meeting on Wednesday. I'm already busy all morning with Brian. I am free that afternoon after 2:00, though"—and Karl's—"Got your message about the meeting. I'll see you at 9:00"—and stores the responses in database 120.

A third stage 150 responsible for reporting the results of the attempts to contact the recipients and their responses obtains the responses from database 120. The reporting may be done in accordance with any scheduling instructions. Using Mary's telephone number available from database 120, stage 150 calls Mary at telephone station 100 and reports back to her that all members of the account team were reached, and offers to play for her the message each has left.

The role of the telephone messaging agent described thus far is simply to deliver messages and record responses. The sender still must process all the responses manually. In the example just described, Mary had to listen to each response, determine whether or not everyone could make the meeting, then decide what action to take. At this point, Mary may choose to decide on a new time and send a new message, since not everyone will be able to attend at the time she requested. Alternatively, if the responses by the Simpson account team were all in the affirmative, Mary could reserve a room and send a confirmation message to the team.

A variation of the telephone messaging agent just described may be implemented to take advantage of additional capabilities. For example, if the agent is given the ability to ask each recipient a question that calls for a response from a fixed vocabulary (e.g., "yes, no" , days of the week, times, dates), the agent can take on more responsibility. To continue with the meeting scheduling example, suppose that Mary instructed her agent to ask each recipient the question "Can you attend the meeting?" and recognize user responses from the vocabulary "yes" or "no".

This simple enhancement gives the agent much more power. At a minimum, the agent can provide Mary a quick summary; for example, if Bill and Karl can attend the meeting, but Susan cannot, the agent can report to Mary "Bill and Karl responded 'yes', and Susan responded 'no'". The more people who were sent the message, the more important is the ability to summarize.

Furthermore, if everyone answered "yes", the agent could undertake additional tasks, such as reserving the room, placing an order for refreshments, and sending everyone a confirmation message. The reserving and ordering tasks could be executed by having the agent call or contact predetermined individuals or departments responsible for these functions. Use of tools such as speech synthesis would allow the agent to make vocal instructions. Of course, it would be up to Mary to determine how much autonomy she wanted the agent to have. According to the present invention, Mary could exercise levels of control that would, under circumstances she determines, allow the telephone agent to have corresponding levels of autonomy in undertaking responsive activity.

Additional variations are possible. A sender might want the agent to ask more than one question and use a more sophisticated recognition grammar. For example, Mary might instruct the agent to send the following message along with a set of questions and recognition grammar:

Message—"Hi everybody, I'd like to meet next week to update you on the Simpson account. I'm trying to find a day and time when everyone is available".

First question—"What is your first choice for meeting day and time of day (morning or afternoon)?"

Recognition Grammar—dayOfWeek +timeOfDay (i.e., a day of the week followed by a "morning" or "afternoon" or "a.m." or "p.m.")

Second question—"What is your second choice for meeting day and time of day (morning or afternoon)?" with the same recognition grammar.

Using a set of questions with recognition format such as these would give the agent the capability of finding a common acceptable meeting time. The agent could then send out confirmations, etc.

Alternatively, a simpler variation could use dual tone multifrequency (DTMF) recognition, instead of voice recognition, in combination with requests to the recipient to press certain buttons on a telephone keypad. DTMF recognition technology is commonly used in, e.g., menu-driven interactive voice response applications. Using DTMF recognition, a recipient could be prompted to key in responses (such as, for example, "1" for "yes" and 9 for "no", or "2" for 2:00, etc.) using a touchtone telephone keypad.

When a recipient is not reached, either because there was no answer or the phone was busy, the agent must know what to do next. The agent could simply count this as a failure and report it back to the sender. A more sophisticated delivery scheme gives the agent the capability of making additional attempts to reach the intended recipient. For example, if the phone is busy, the agent could be instructed to try back 5 or 10 minutes later. If there is no answer, the agent could be instructed to try again in an hour. More generally, the telephone agent may include a flexible, user tailorable or programmable delivery scheme that specifies how long to try delivering a message or how often to make attempts. Reasonable defaults could be applied, e.g., try for 24 hours, make a delivery attempt once an hour between 8:00 am. and 6:00 p.m., and leave a message only when the 24 hour period is up.

A even more sophisticated variation of the subject invention is a personal telephone agent used in connection with information retrieval (IR) tasks, such as the example shown in FIG. 2. The IR telephone agent of FIG. 2 includes, in addition to the elements depicted in FIG. 1, an interface for the agent to supply the information source a designated item description, e.g., in terms of attribute-value pairs. In other respects, the operation of the IR telephone messaging agent shown in FIG. 2 is similar to the telephone messaging agent of FIG. 1.

Referring to FIG. 2, the user accesses the IR telephone messaging agent through telephone station 200, instructing a first stage 210 to retrieve the desired information, e.g., a flight schedule between two cities. Stage 210 of the agent is responsible for obtaining the desired information in the form of descriptions of the items of interest. Stage 210 could, in addition, obtain from the sender a list of intended information sources. Stage 210 encodes the item descriptions into an internal representation understood by the information source, and sends the request to database 220 along with any identification of intended information sources. Stage 210 may also send to database 220 information about the identification of the sender and the date and time of the message, and submit instructions for scheduling the retrieval of the requested information. Database 220 contains an index of information sources keyed to the subject matter of the requested information and their telephone numbers.

In accordance with any scheduling instructions, a second stage 230 responsible for delivering the information requests and collecting responses obtains the information request along with information identifying the information sources and the telephone numbers for such sources from database 220.

Stage 230 then attempts to deliver the information request to each one of, say, N information sources over network 240. To reach the first information source, stage 230 dials the telephone number corresponding to the source and connects through interface 241 to information source 242. Upon making the connection, stage 230 delivers the information request to interface 241 by sending the encoded descriptions to interface 241, which then uses the encoded information to automatically navigate information source 242 for the desired information. Through interface 241, the desired information is extracted from information source 242 and sent back to stage 230, which stores the information in database 220. Stage 230 then turns to the next information source 244 by dialing its telephone number and extracts the desired the information in a similar way through interface 243. Stage 230 continues the process through the last information source 246, extracting the information through interface 245. Interfaces 241, 243 or 245 of FIG. 2 could be located with the personal telephone agent platform or, alternatively, they could be located with the information source. In either event, each interfaces would be designed to reformat internal data representation between a generalized form internal to the agent and a form individually compatible with an information source. This provides the advantage of allowing access to information databases currently accessible through IVR systems with no additional changes to the databases. The interface becomes a complementary module to the IVR menu interface that may already be present.

The decoding and encoding of information transfers the state of information between an internal representation of items, attributes, and values suitable for transmission, on the one hand, and textual descriptions of items, attributes, and values appropriate for communication with a person, on the other hand. One of the keys to this is that agents and services must share common vocabularies and communication protocols.

If an information source is not reached, stage 230 may retry delivery at predetermined intervals until the recipient is reached. After a certain amount of time and number of unsuccessful delivery attempts, the attempt to retrieve information from that source is considered to have failed.

To continue, a third stage 250 responsible for reporting the retrieved information obtains the retrieved information that has been stored on database 220. The reporting may be done in accordance with any scheduling instructions or, alternatively, the reporting may take place at one or more times, such as after the completion of the information gathering from all sources, after the information is gathered from any individual source, or at predetermined time intervals. Using the sender's telephone number available from database 220, stage 250 calls the user at telephone station 200 and reports back the information located. As a variation, stage 250 may decode the information returned by the service back into a format suitable for presentation to the user and also summarize the information as part of the reporting process.

The three stages of the telephone messaging processes described above—getting the message and recipients (or information retrieval requests), delivering messages (or retrieval requests) and collecting responses (or information), and reporting the results—may be implemented on a common computer architecture having a CPU, data storage, and communication channels (e.g., a modem connected to a telephone line) as three separate program applications which communicate through a shared database and schedule each other to run as appropriate. Computer systems such as a PC or workstations such as those sold by Sun Microsystems have sufficient processing, storage and data handling capability. Common computer systems may be supplemented by capabilities, such as voice recognition, speech recognition, speech synthesis, and dual-tone multifrequency (DTMF) recognition (useful for recognizing buttons pushed on a telephone keypad), implemented by use of plug-in cards which are typically available in the marketplace.

One type of available computer-based platform having these capabilities is known in the telecommunications industry as an interactive voice server (IVS). An IVS known as CONVERSANT® produced by Lucent Technologies provides an adequate platform for implementing the above-described personal telephone agent. Creating the type of personal telephone agent with desired flexibility is possible by programming the CONVERSANT® IVS system using a software tool set known as DynaDesigner™. The DynaDesigner™ tool set is compatible with the CONVERSANT® IVS system and has been used to develop other applications for the CONVERSANT®. Through the DynaDesigner™ software tool set, a set of personal telephone agents may be created for the CONVERSANT® IVS system that are tailored to any one of a series of specific but routine communicative tasks, such as the meeting scheduling task described above. Using such an implementation, one may operate a personal telephone agent in accordance with the present invention by connecting the agent platform to a switch commonly found in telecommunications networks, such as the AT&T 4ESS® switch or the AT&T 5ESS® switch. The agent platform could then be reached by dialing a telephone number (such as an "800" number). Alternatively, the functionality of a personal telephone agent could be implemented on a PBX system and accessed through the PBX.

In summary, automated personal telephone agents for automating routine communicative tasks of coordinating, scheduling and information retrieval have been described utilizing the respective advantages of personal agents and the telephone system in combination.

What has been described is merely illustrative of the application of the principles of the present invention. Other arrangements and methods can be implemented by those skilled in the art without departing from the spirit and scope of the present invention.

What is claimed is:

1. A method of operating an automated personal telephone agent for messaging, comprising the steps of:

a. recording a message specified by a sending party;

b. identifying each intended recipient of the message;

c. calling the telephone number for each intended recipient;

d. when an intended recipient's telephone line is answered:

(i) sending the message to the answered telephone line; and (ii) automatically recording a response to the message by the recipient; and e. reporting a summary of the results of the call attempts made to each intended recipient back to the sending party based on an analysis of the recorded response of at least one recipient.

2. The method according to claim 1, further comprising the step of when an intended recipient's telephone line is not answered, repeating the step of calling the intended recipient's telephone number at least one time until the recipient's telephone line is answered.

3. The method according to claim 2, wherein the step of repeated calling of the intended recipient's telephone number ceases after the occurrence of at least one of:

a. a maximum number of call attempts has been made; or
   b. a predetermined amount of time has elapsed.

4. The method according to claim 1, wherein the step of recording any response to the message by the recipient includes the use of at least one of voice recognition or speech recognition techniques for identifying words spoken by the recipient in response to the message.

5. The method according to claim 1, wherein the step of recording any response to the message by the recipient includes the recognition of the pressing of a button on a telephone keypad by the recipient in response to the message.

6. The method according to claim 1, wherein the step of reporting the results of the call attempts includes playback of at least one of the recorded responses.

7. The method according to claim 1, wherein the step of reporting the results of the call attempts includes summarizing the results of the call attempts.

8. The method according to claim 7, wherein the step of summarizing the results of the call attempts includes determining from each response information corresponding to a predetermined set of information categories.

9. The method according to claim 1, further comprising the step of before reporting the results of the call attempts made to each intended recipient back to the sending party, determining at least one task from a predetermined set of tasks to be carried out by the telephone messaging agent in accordance with the results of the call attempts.

10. The method according to claim 9, wherein the step of reporting the results of the call attempts includes identifying to the sender each task determined to be carried out by the telephone messaging agent in accordance with the results of the call attempts.

11. The method according to claim 9, further comprising the step of after determining at least one task from a predetermined set of tasks to be carried out by the telephone messaging agent in accordance with the results of the call attempts, initiating each such determined task.

12. The method according to claim 11, wherein the step of reporting the results of the call attempts includes identifying to the sender each task initiated by the telephone messaging agent in accordance with the results of the call attempts.

13. A method of operating an automated personal telephone agent for messaging, comprising the steps of:

a. recording a message specified by a sending party;
   b. identifying each intended recipient of the message;
   c. calling the telephone number for each intended recipient;
   d. when an intended recipient's telephone line is answered:

(i) sending the message to the answered telephone line; and
      (ii) automatically recording a response to the message by the recipient; and e. initiating at least one task from a predetermined set of tasks in accordance with the results of the call attempts based on an analysis of the recorded response of at least one recipient.

14. The method according to claim 13, further comprising the step of when an intended recipient's telephone line is not answered, repeating the step of calling the intended recipient's telephone number at least one time until the recipient's telephone line is answered.

15. The method according to claim 14, wherein the step of repeated calling of the intended recipient's telephone number ceases after the occurrence of at least one of:

a. a maximum number of call attempts has been made; or
   b. a predetermined amount of time has elapsed.

16. The method according to claim 13, wherein the step of recording any response to the message by the recipient includes the use of at least one of voice recognition or speech recognition techniques for identifying words spoken by the recipient in response to the message.

17. The method according to claim 13, wherein the step of recording any response to the message by the recipient includes the recognition of the pressing of a button on a telephone keypad by the recipient in response to the message.

18. An automated personal telephone agent for messaging, comprising:

a. a message recorder that receives and stores a message specified by a sending party;
   b. an automatic telephone dialer that calls at least one intended message recipient;
   c. a message transmitter that sends a stored telephone message to an intended recipient wherein the message includes a prompt for the recipient to provide a response;
   d. a response recorder that automatically captures a response to the message; and
   e. a report generator that reports a summary of the results, of call attempts to intended recipients back to the sending party based on an analysis of the recorded response of at least one recipient.

19. The automated personal telephone agent for messaging according to claim 18, further comprising a processor programmed to cause the automatic dialer to repeat call attempts to an intended recipient.

20. The automated personal telephone agent for messaging according to claim 18, further comprising at least one of a voice recognizer or speech recognizer.

21. The automated personal telephone agent for messaging according to claim 18, further comprising a DTMF detector that detects the pressing of a button on a telephone keypad.

22. The automated personal telephone agent for messaging according to claim 18, further comprising a processor programmed to initiate at least one task from a predetermined set of tasks in accordance with the results of the call attempts based on the content of the recorded response of at least one recipient.

23. The automated personal telephone agent for messaging according to claim 18, further comprising a speech synthesizer.

24. An automated personal telephone agent for messaging, comprising:

a. a message recorder that receives and stores a message specified by a sending party;

b. an automatic telephone dialer that calls at least one intended message recipient;

c. a message transmitter that sends a stored telephone message to an intended recipient wherein the message includes a prompt for the recipient to provide a response;

d. a response recorder that automatically captures a response to the message; and e. a processor programmed to initiate at least one task from a predetermined set of tasks in accordance with the results of the call attempts based on an analysis of the recorded response of at least one recipient.

25. The automated personal telephone agent for messaging according to claim 24, further comprising processor programmed to cause the automatic dialer to repeat call attempts to an intended recipient.

26. The automated personal telephone agent for messaging according to claim 24, further comprising at least one of a voice recognizer or speech recognizer.

27. The automated personal telephone agent for messaging according to claim 24, further comprising a DTMF detector that detects the pressing of a button on a telephone keypad.

28. The automated personal telephone agent for messaging according to claim 24, further comprising a speech synthesizer.

29. A method of operating an automated personal telephone agent for information retrieval, comprising the steps of:

a. recording a desired information request specified by a requesting party;

b. identifying each intended information source;

c. calling the telephone number for each intended information source;

d. when an intended information source's telephone line is answered:
   (i) sending the information request to the answered telephone line; and
   (ii) automatically recording a response to the information request by the information source; and e. reporting the results of the information retrieval requests back to the requesting party based on an analysis of the recorded response of at least one information source.

30. The method according to claim 29, further comprising the step of when an intended information source's telephone line is not answered, repeating the step of calling the intended information source's telephone number at least one time until the source's telephone line is answered.

31. The method according to claim 30, wherein the step of repeated calling of the intended information source's telephone number ceases after the occurrence of at least one of:

a. a maximum number of call attempts has been made; or b. a predetermined amount of time has elapsed.

32. The method according to claim 29, wherein the step of recording a response to the information request by the information source includes the use of at least one of voice recognition or speech recognition techniques for identifying words uttered by the source in response to the message.

33. The method according to claim 29, wherein the step of reporting the results of the call attempts includes summarizing the results of the call attempts.

34. The method according to claim 29, further comprising the step of after sending the information request, using an encoded description of the desired information request to automatically navigate the intended information source.

35. The method according to claim 34, wherein requested information is automatically extracted from at least one intended information source.

36. An automated personal telephone agent for information retrieval, comprising:

a. recorder that receives and stores a desired information request specified by a requesting party;

b. an encoder that encodes the information request into a data format suitable for transmission to an information source;

c. an automatic telephone dialer that calls at least one information source;

d. a transmitter that sends the information request to at least one information source;

e. a recorder that automatically captures information retrieved from at least one information source;

f. a decoder that decodes the retrieved information into a format suitable for communication to the requesting party; and g. a report generator that reports the requested information including the results of the call attempts back to the requesting party based on an analysis of the recorded response of at least one information source.

37. The automated personal telephone agent for information retrieval according to claim 36, further comprising a processor programmed to cause the automatic dialer to repeat call attempts to an information source.

38. The automated personal telephone agent for information retrieval according to claim 36, further comprising at least one of a voice recognizer or speech recognizer.

39. The automated personal telephone agent for information retrieval according to claim 36, further comprising DTMF detector that detects the pressing of a button on a telephone keypad.

40. The automated personal telephone agent for information retrieval according to claim 36, further comprising a speech synthesizer.

41. The automated personal telephone agent for information retrieval according to claim 34, wherein an encoded description of the desired information request is used to automatically navigate an information source.

42. The automated personal telephone agent for information retrieval according to claim 41, wherein requested information is automatically extracted from at least one information source.

* * * * *